(12) United States Patent
Turner et al.

(10) Patent No.: US 6,334,273 B2
(45) Date of Patent: *Jan. 1, 2002

(54) FISH HOOK AND KNOT THEREFOR

(75) Inventors: Jeffrey William Turner, Unit 4, 13 River Road, Wollstonecraft, NSW 2065 (AU); James Otter Turner, Penrith (AU)

(73) Assignee: Jeffrey William Turner, Woolstonecraft (AU)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/202,447
(22) PCT Filed: Jun. 13, 1997
(86) PCT No.: PCT/AU97/00373
§ 371 Date: Dec. 15, 1998
§ 102(e) Date: Feb. 5, 1999
(87) PCT Pub. No.: WO97/49280
PCT Pub. Date: Dec. 31, 1997

(30) Foreign Application Priority Data

Jun. 25, 1996 (AU) .............................. PO 0667
Aug. 2, 1996 (AU) .............................. PO 1404

(51) Int. Cl.[7] .............................................. A01K 91/04
(52) U.S. Cl. ...................................... 43/44.83; 43/43.16
(58) Field of Search .................... 43/42.49, 43.16, 43/44.83; 289/1.2, 1.5, 18.1

(56) References Cited

U.S. PATENT DOCUMENTS

| 1,961,378 A | 6/1934 | Mitchell ........................ 43/40 |
| 2,825,174 A | 3/1958 | Leinonen ..................... 43/44.8 |
| 2,938,296 A | 5/1960 | Kracht ....................... 43/43.16 |
| 3,626,629 A | 12/1971 | Lowery ...................... 43/43.2 |
| 3,834,060 A | 9/1974 | Wagenknecht ............. 43/44.8 |
| 4,107,866 A | 8/1978 | Manno ...................... 43/44.83 |
| 4,209,933 A | 7/1980 | Manno ...................... 43/43.15 |
| 4,294,031 A | 10/1981 | Manno ...................... 43/43.16 |
| 4,819,366 A | 4/1989 | Manno ...................... 43/44.81 |
| 4,905,403 A | 3/1990 | Manno ...................... 43/43.16 |
| 5,237,772 A | 8/1993 | Gibbs ........................ 43/44.8 |
| 5,279,067 A * | 1/1994 | Tollson ..................... 43/44.83 |

FOREIGN PATENT DOCUMENTS

| AU | 417073 | 10/1971 | |
| GB | 2030032 A * | 1/1979 | .......... A01K/91/00 |

* cited by examiner

Primary Examiner—Charles T. Jordan
Assistant Examiner—Nicholas W DiCostanzo
(74) Attorney, Agent, or Firm—Foley & Lardner (57) ABSTRACT

A fish hook (10) comprising: a hook portion (11); a shank (12) extending from the hook portion (11); and a line attachment portion (13) to engage a fishing line (17) to secure the fishing line (17) to the hook (10), said attachment portion (13) comprising a pair of a legs (14, 15) which extend to a junction, with one of the legs (14, 15) having a free end (16) and the other leg being a continuation of the shank (12), said legs (14, 15) each having a line engagement portion (33), with the line engagement portions (33) being spaced by a distance of at least one time the diameter of the fishing line (17). A knot to secure the hook (10) and a method of forming it is also disclosed.

10 Claims, 7 Drawing Sheets

FISH HOOK AND KNOT THEREFOR

TECHNICAL FIELD

The present invention relates to fishing hooks.

BACKGROUND OF THE INVENTION

Fishing hooks have conventionally consisted of a hook portion from which there extends a shank. The shank terminates with an eyelet which cooperates with the fishing line to secure the hook to the fishing line.

Securing the line to a conventional fishing hook is reasonably tedious and time consuming. These problems are exacerbated in cold weather or if the user is wearing gloves. Still further, conventional attachment methods are known to fail in that the hook becomes detached.

The two most common knots used are the blood knot or several half hitches which, when tied by amateurs, result in a reduction of the achievable line strength by 30 to 50% from the nominal line strength. This is due to the fact that today most mono-filament lines are very good in tensile strength but are weakened easily by heating and chain relocation. Most of the afore mentioned conventional knots cause the polymer chain to twist in both dimensions around sharp angles especially as the line tightens against itself in knot formation. These distortions create frictional heat and the knot and line wrapping does not allow generated heat to escape, thereby reducing the normal line strength significantly. The above problems are equally applicable to the construction of commercial fishing lines, in which the hooks are secured to the line by means of a mechanically constructed knot. These knots formed by machine in addition to the afore mentioned problems frequently over stress the line which can further increase the possibility of failure of the line.

From the above it follows that conventional fishing hooks with an eyelet onto which the fishing line is secured using conventional attachment knots does significantly limit the line strength, i.e. premature line breaking occurs.

SUMMARY OF THE INVENTION

In accordance with a first aspect of the present invention there is provided a method of forming a knot to attach a fishing line to a fishing hook, the hook having a shank terminating at one end with a line attachment portion including a retaining means and terminating at another end with a hook portion, said method including the steps of locating two portions of the line together so that the line portions are generally co-extensive, wrapping the coextensive portions about the shank to form pairs of convolutions, with each pair consisting of a convolution from each coextensive portion, a first one of the pairs being located closer to the hook portion and a second one of the pairs being located closer to the attachment portion, with said line extending from one of the coextensive portions of the first one of the pairs back upon itself to the other coextensive portion of the first one of the pairs so that the line forms a loop, passing said loop over said attachment portion, moving the convolutions to said retaining means and applying a force to one or both of the lines extending from the pair of convolutions closest to the retaining means away from the convolutions so as to diminish the size of the loop without the loop being passed back over the attachment portion.

In accordance with a second aspect of the present invention there is provided a fish hook including a hook portion, a shank extending from the hook portion, and a line attachment portion to engage a fishing line to secure the fishing line to the hook, said attachment portion including two legs which extend from a junction, with a first of the legs having a free end which in use remains spaced from the secured leg, and a second leg being connected to the shank, wherein the second leg is arranged to extend in substantially the same direction as the shank, said legs each having a line engagement portion, with the line engagement portions, from the free end of the first leg substantially to the junction, being spaced by a distance of at least one times the diameter of the fishing line, the first leg being arranged such that a blood knot when tied from the fishing line at the attachment portion could be slid off along the second leg, and slid around the junction and shield along the first leg and over the free end of the first leg.

Preferably, an elongated clear space is defined between said line engagement portions, the clear space having a length several times the spacing between the line engagement portions.

Advantageously, the first leg terminates with an end portion which diverges away from the second leg.

Further, the line engaging portions are preferably spaced by a distance of between one and two times the fishing line diameter.

Preferably, the hook is formed from plastic or metal.

In accordance with a third aspect of the present invention there is provided a knot to secure the hook of any one of claims 2 to 6, said knot including a pair of generally parallel coextensive line portions wound about one of said two legs to form pairs of convolutions and extending to a loop joining the line portions, the loop being formed around one of the two legs with said line portions passing between the loop and the pairs of convolutions.

In accordance with a fourth aspect of the present invention there is provided a method of forming a knot to attach a fishing line to a fishing hook, the hook having a shank terminating at one end with the line attachment portion including a termination portion and terminating at another end with a hook portion, said method including the steps of wrapping the fishing line at least twice about the shank to form at least two convolutions, with a first portion of the line having a free end extending from a first of the at least two convolution located closest to the attachment portion, moving the convolutions to said retaining means and pulling a second portion of the line extending from a second one of the at least two convolutions being located furthest away from the retaining means so that the second portion crosses the convolutions and the first portion of the fishing line.

In accordance with a fifth aspect of the present invention there is provided a knot to secure the hook of the invention, said knot including a first portion of the line being wound about the first or the second leg to provide a plurality of convolutions, a second portion of the line having a free end extending from a first one of the convolutions being located closest to the junction, and a third portion of the line extending from a second one of the convolutions located furthest away from the junction back over the convolutions and said second portion.

It is an advantage of at least one embodiment of the present invention to provide a knot that reduces damaging effects to the fishing line during the tying of the knot as the tightening occurs around the shank of the hook thereby resulting in a larger diameter with a gentler bending rate when compared to a knot wherein the line is bent around itself (i.e. a smaller diameter). In at least one embodiment the shank acts as a heat sink for the fishing line thereby conducting frictional heat that may be created under a varying load away from the knot (i.e. the fishing line). It is another advantage of at least one embodiment of the invention to provide a knot configured such that tying occurs without excessive frictional resistance as the knot forms on the shank with little slippage (thus light tension) when compared to a knot wherein the tightening includes tightening the line against itself.

A further advantage of at least one embodiment of the invention to provide a knot that applies less degrees of twist per length of line in the knot thus reducing the chain damage due to the twisting of the line.

It is another advantage of at least one embodiment of the invention to provide a knot wherein the line spirals along the shank of the hook such that under load the line does not twist or rotate excessively but does elongate by slight slippage along the hook.

The invention may be more fully understood from the following description of preferred embodiments of the method, the hook and the knot of the present invention provided with the accompanying drawings.

BRIEF DESCRIPTION OF THE DRAWINGS

In the figures

DETAILED DESCRIPTION OF THE PREFERRED EMBODIMENT

In the accompanying drawings there is schematically depicted a fish hook 10. The fish hook 10 has a hook portion 11 extending to a shank 12. The shank 12 extends to an attachment portion 13. The attachment portion 13 in this embodiment is of a "U" configuration in that a pair of spaced legs 14 and 15 are provided. The leg 15 is a continuation of the shank 12, while the leg 14 has an end part 16 which diverges with respect to the other leg 15.

The fishing line 17 is attached to the hook 10 in the following manner.

Figure 1A:
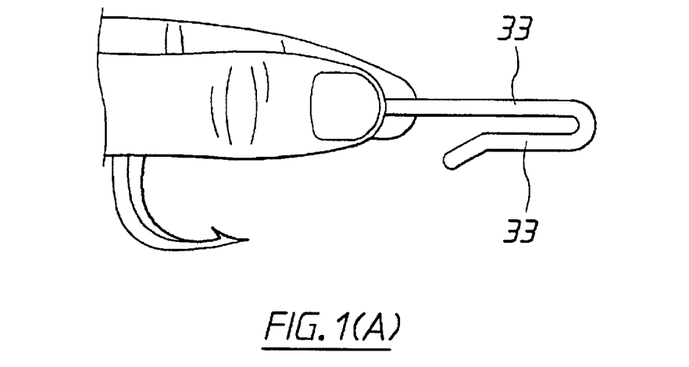
FIG. 1 is a schematic side elevation of the steps of applying a fishing line to a fishing hook.
Figure 1B:
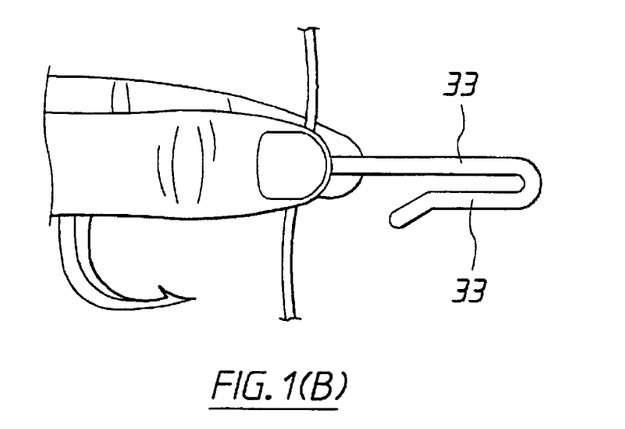
Figure 1C:
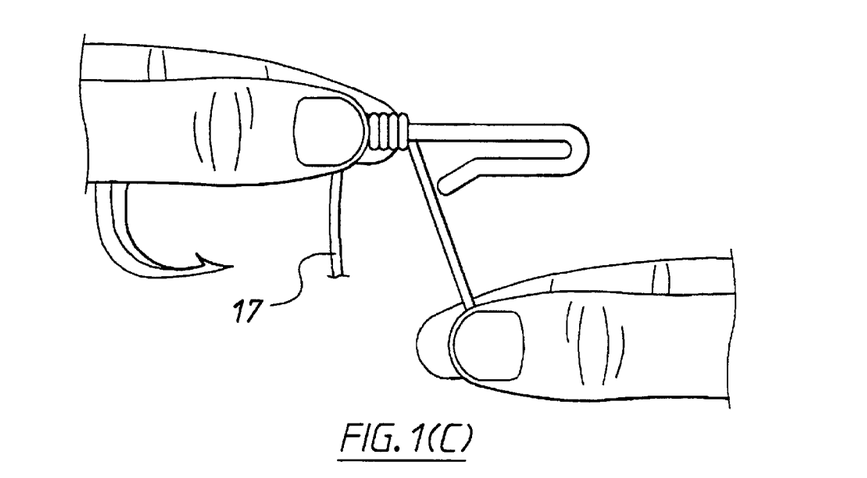

The hook is held between the thumb and a finger with the hook portion 11 closer to the palm of the hand. The attachment portion is exposed as best seen in FIG. 1(A).

Figure 1D:
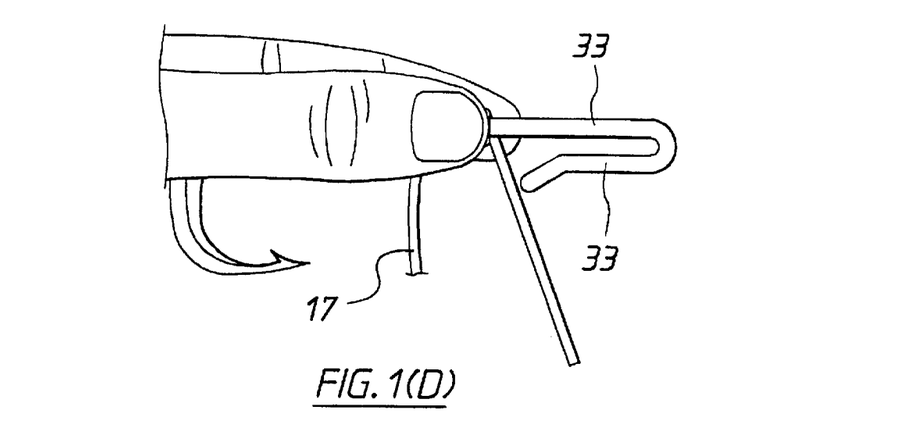
Figure 1E:
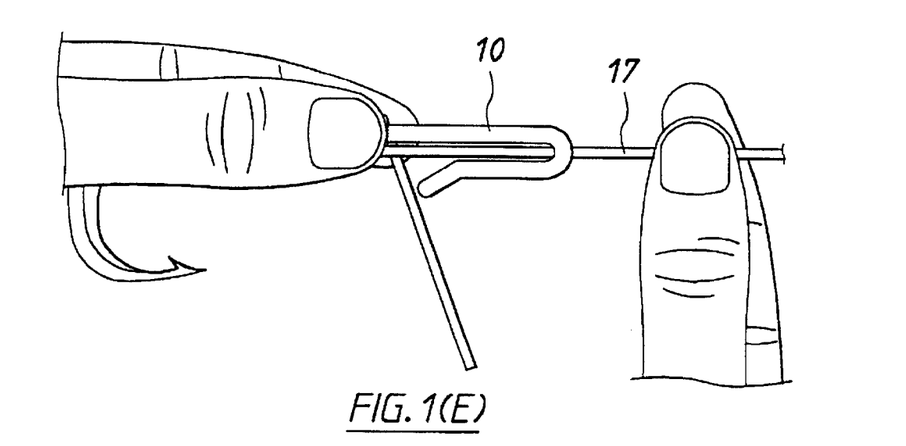
Figure 1F:
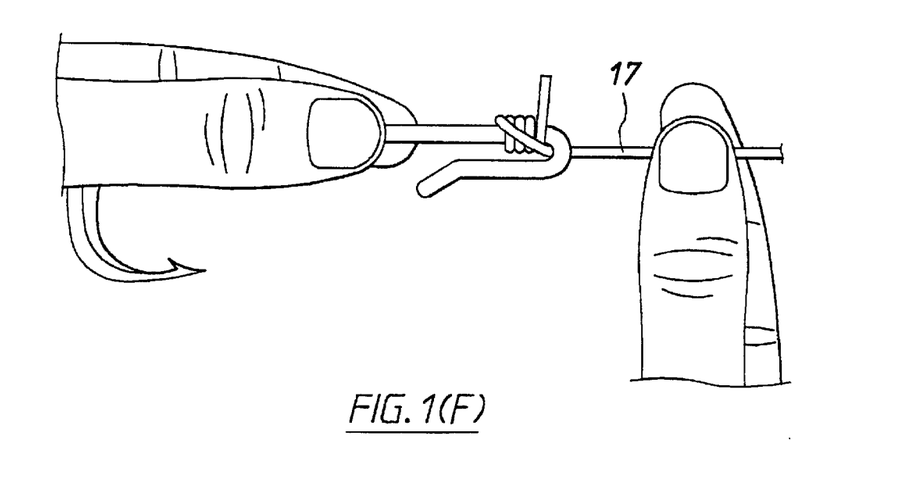

The line is then gripped and wrapped around the shank three or four times. This is shown in FIG. 1(D). In that regard it should be appreciated that the line can be wrapped clockwise or anti-clockwise about the shank 12.

Figure 2:
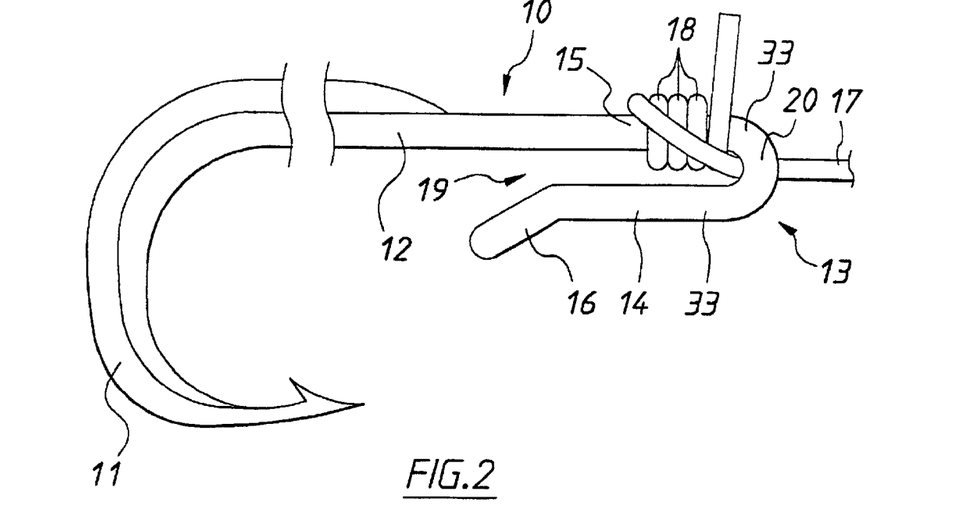
FIG. 2 is a schematic side elevation of the fishing hook of FIG. 1 with the fishing line attached thereto.
Figure 3:
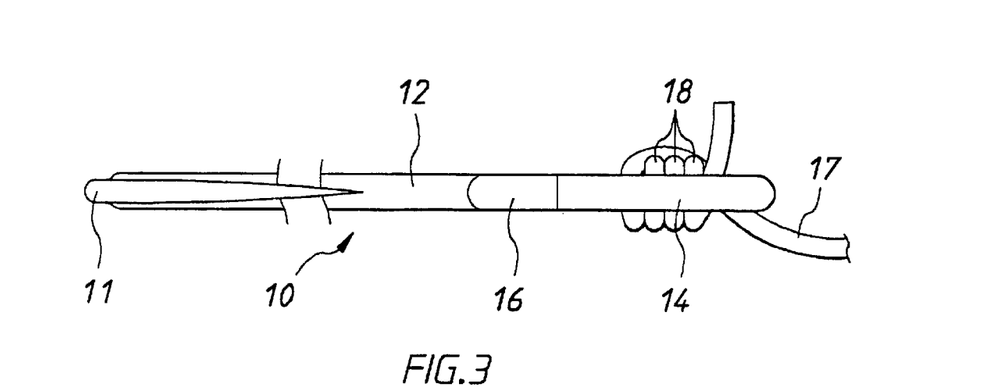
FIG. 3 is a schematic top plan view of the fishing hook and line of FIG. 2.
Figure 4:
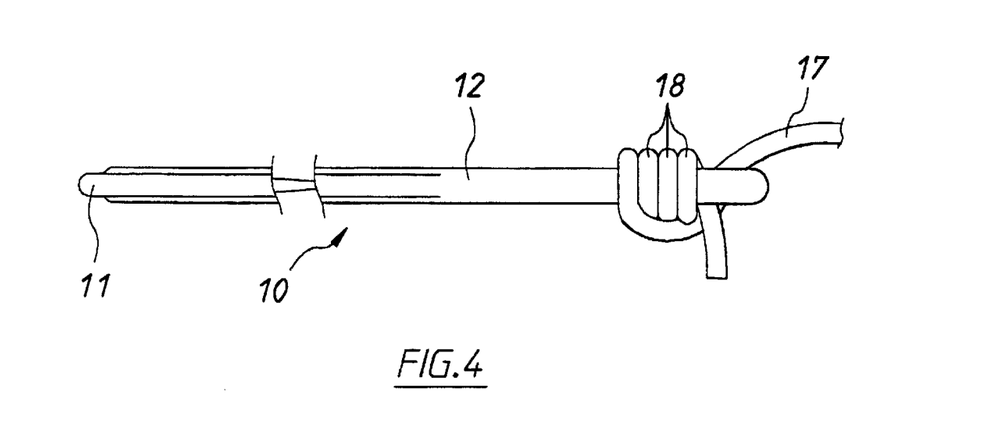
FIG. 4 is a schematic bottom plan view of the fishing hook of FIG. 2.
Figure 5A:
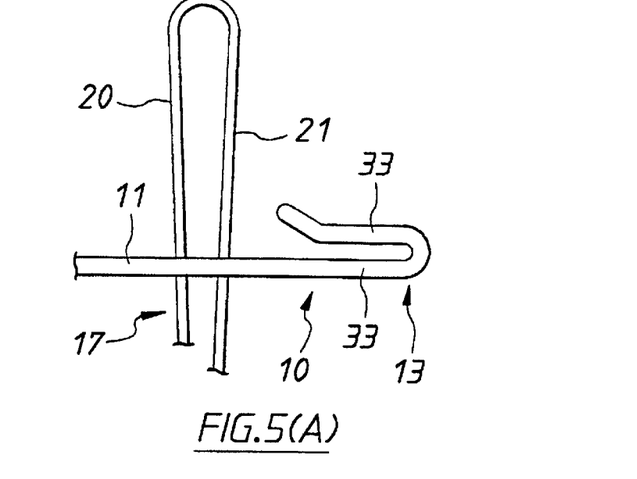
FIG. 5 is a series of schematic illustrations of method steps of applying a fishing line to the fishing hook of FIG. 1.
Figure 5B:
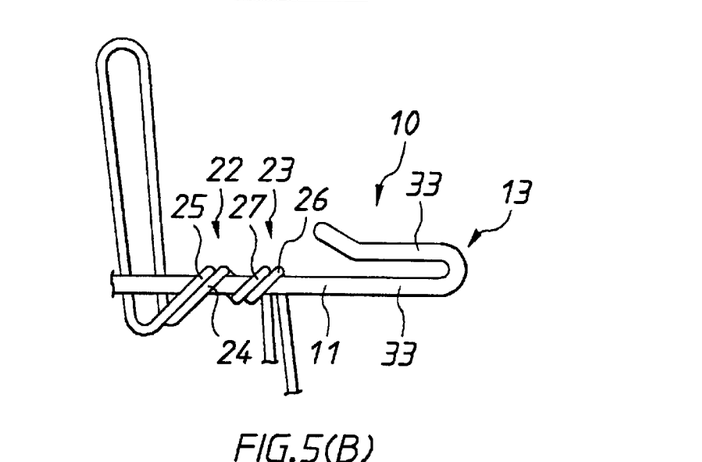
Figure 5C:
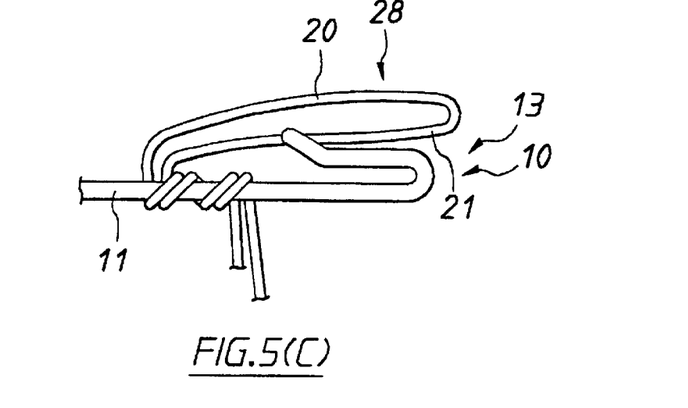
Figure 5D:
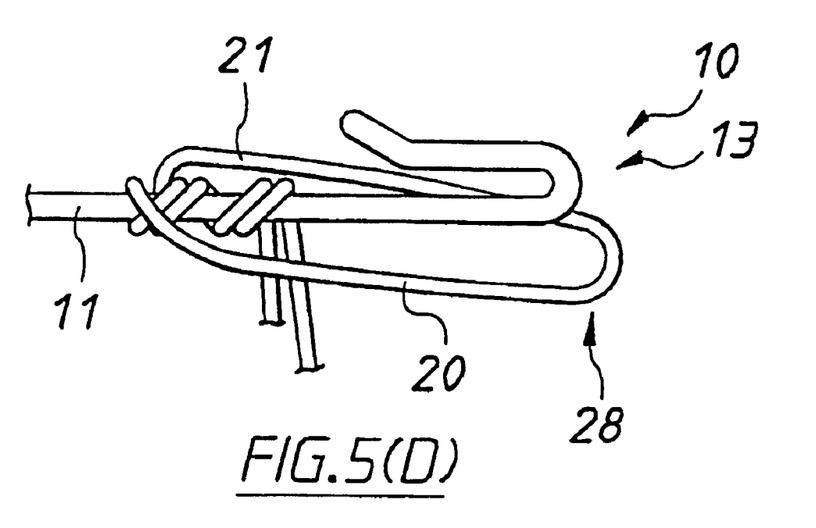
Figure 5E:
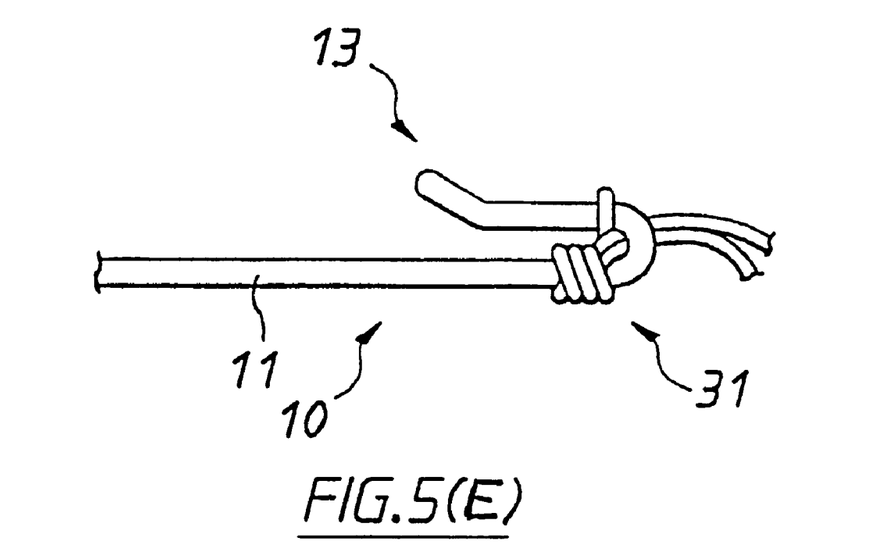
Figure 5F:
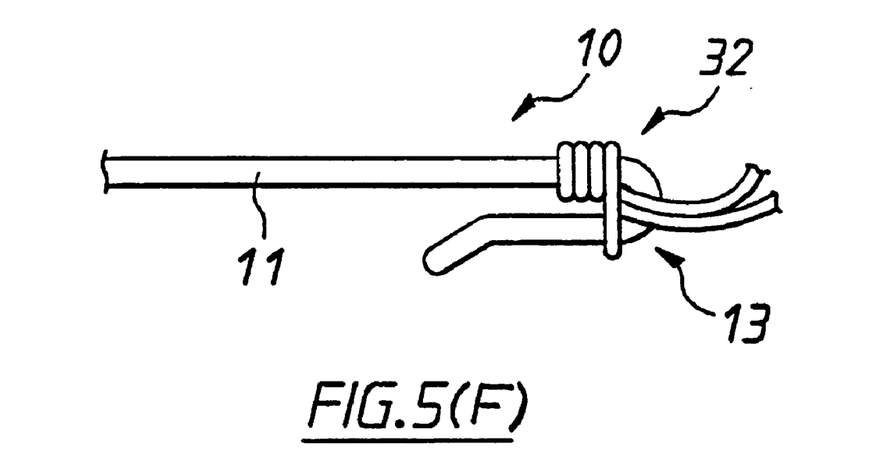

The free end of the line is released and the other portion of the line extending from the shank 12 is gripped and pulled so that the coils 18 are pulled into the slot 19. The finished assembly is best seen in FIGS. 2 to 4.

Preferably the legs 14 and 15 have line engaging portions 33 separated by a distance of at least one times the diameter of the line 17. When the hook 10 is formed of plastics material, preferably the portions 33 are spaced by one to two times the line diameter. It is also preferred that the slot 19 defined between portions 33 has a length of approximately five times the diameter of the line 17.

The slot 19 could taper towards the end junction 20.

To remove the line 17, the coils 18 are moved down the shank 12 towards the hook portion 11.

In FIG. 5 there is illustrated a knot 32. In this embodiment the fishing line 17 is held so as to provide two generally co-extensive line portions 20 and 21. The portions 20 and 21 are wrapped around the shank 11 as best seen in FIG. 5(B) so as to form at least two sets 22 and 23 of convolutions. Each set 22 and 23 consists of a pair of convolutions 24 and 25 and 26 and 27. The set of convolutions 22 is closest to the hook portion of the hook 10, while the set of convolutions 23 is closest to the attachment portion 13. Extending from the set 22 is a loop 28 which is passed over the attachment portion 13 so that the line portion 20 is on the side of the shank 11 that can be seen while the portion 21 is on the other side of the shank 11. The loop 28 is then located in the position shown in FIG. 5(D). Thereafter, the convolutions are moved into engagement with the attachment portion 13 and one or preferably both of the line portions are pulled so as to decrease the size of the loop 28 so that a knot 32 is formed. (During this step it has to be ensured that the loop 28 is not passed back over the attachment portion 13.) FIG. 5(E) is the top plan view of the knot 32, while 5(F) is the bottom plan view.

The above described preferred embodiments have the advantages of making it easy to attach the line 17 to the hook 10. The tedious steps of trying to thread the line through the eye of and then tying a conventional hook are eliminated.

Figure 6:
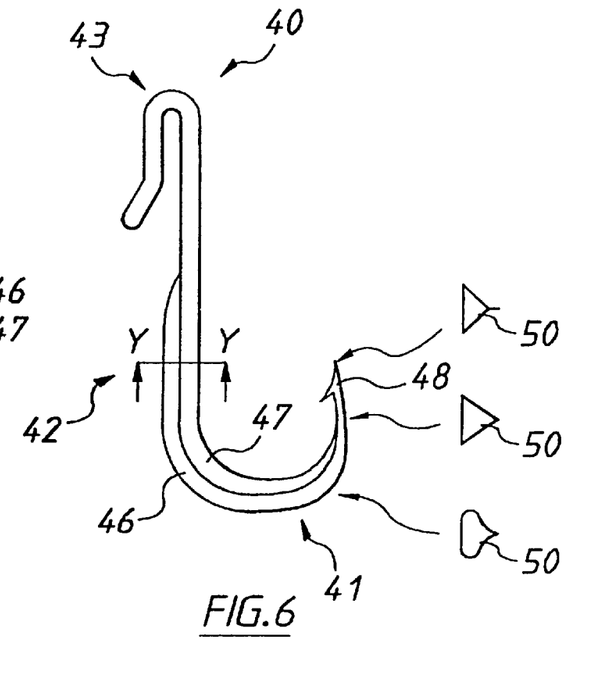
FIG. 6 is a schematic side elevation of a hook.

In FIG. 6 there is schematically depicted a fishing hook 40. The hook 40 is similar to the previous embodiments except that in the present instance the hook 40 is formed of plastics material and would preferably be moulded therefrom. The hook 40 has a hook portion 41 extending to a shank 42. The shank 42 extends to an attachment portion 43. The arrangement is basically the same as the previously discussed embodiments.

Figure 7:
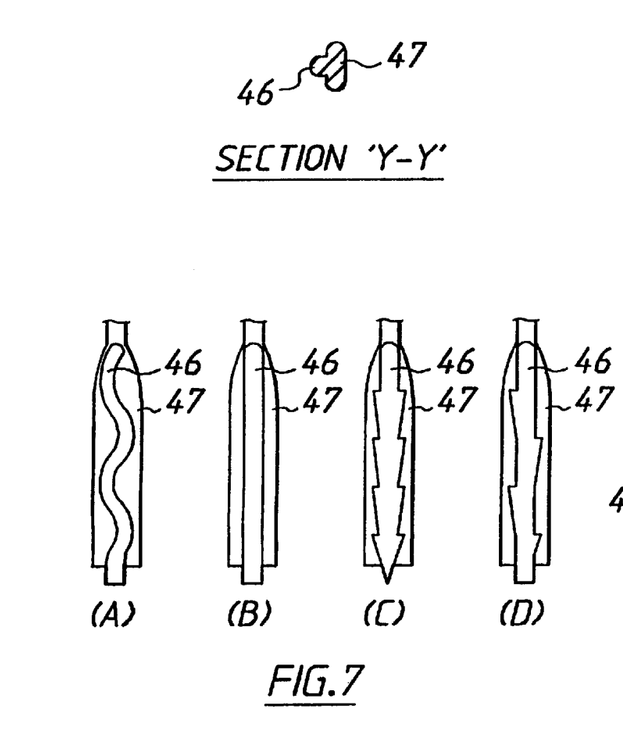
FIG. 7 provides four end elevations of different modifications of one hook portion of the hook of FIG. 6.
Figure 8:
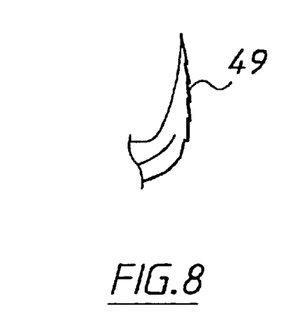
FIG. 8 provides a side elevation of a modification of one portion of the hook of FIG. 6.

The shank 42 is of a "T" transverse cross section so as to provide a longitudinally extending ridge 46 extending from a base 47. The ridge 46 may also extend to the hook portion 41. The ridge 46 may be straight as illustrated in FIG. 7(B) or may follow a curved path as shown in FIG. 7(A). As a further alternative, the ridge 46 may be provided with barbs as shown in FIGS. 7(C) and 7(D). As a further alternative the hook portion 41 may terminate with a barbed end 48 provided with smaller barbed portions 49 as shown in FIG. 8. The ridge 46 may include the barbs to aid in holding bait on the hook portion 41.

The hook portion 41 may also be of a triangular transverse cross section as shown by the cross sections 50.

It would be appreciated by a person skilled in the art that numerous variations and/or modifications may be made to the present invention as shown in the specific embodiment without departing from the spirit or scope of the invention as broadly described. The present embodiment is, therefore, to be considered in all respects to be illustrative and not restrictive.

The claims defining the invention are as follows:

1. A method of forming a knot to attach a fishing line to a fishing hook, the hook having a shank terminating at one end with a line attachment portion including a retaining means and terminating at another end with a hook portion, said method including the steps of:

locating two portions of the line together so that the line portions are generally co-extensive;

wrapping the co-extensive portions about the shank to form pairs of convolutions, with each pair consisting of a convolution from each coextensive portion, a first one of the pairs being located closer to the hook portion and a second one of the pairs being located closer to the attachment portion, with said line extending from one of the coextensive portions of the first one of the pairs back upon itself to the other coextensive portion of the first one of the pairs so that the line forms a loop;

passing said loop over said attachment portion;

moving the convolutions to said retaining means and applying a force to one or both of the lines extending from the pair of convolutions closest to the retaining means away from the convolutions so as to diminish the size of the loop without the loop being passed back over the attachment portion.

2. A fish hook and fishing line combination including:

a hook portion;

a shank extending from the hook portion; and a line attachment portion to engage the fishing line to secure the fishing line to the hook, the attachment portion including two legs that extend from a junction, a first leg of the two legs having a free end that, in use, remains spaced from a second leg of the two legs, the second leg being connected to the shank and arranged to extend in substantially the same direction as the shank, the first and second legs each having a line engagement portion, with the line engagement portions, from the free end of the first leg substantially to the junction, being spaced by a distance of at least one times a diameter of the fishing line, wherein the line engagement portion of the first leg has a leg part and an end part extending between the leg part and the free end of the first leg, and wherein the leg part is substantially parallel to the second leg, and the end part diverges away from the second leg, and wherein the fishing line includes a pair of generally parallel coextensive line portions wound about the second leg to form pairs of convolutions and extending to a loop joining the two line portions, the loop being formed around the first leg with the line portions passing between the loop and the pairs of convolutions.

3. The hook and line combination of claim 2, wherein an elongated clear space is defined between the line engagement portions, the clear space having a length several times the spacing between the line engagement portions.

4. The hook and line combination of claim 2, wherein the line engagement portions are spaced by a distance of between one and two times the fishing line diameter.

5. The hook and line combination of claim 2, wherein lie hook is formed from plastic or metal.

6. The hook and line combination of claim 2, wherein the end part is of a length of several times the diameter of the fishing line.

7. A fish hook and fishing line tied thereto, comprising:

a hook having a hook portion, a shank extending along an axis from the hook portion, and a U-shaped terminal portion having first and second legs substantially parallel to one another and connected by a smoothly-curved junction portion, the first leg having an end part which diverges away from the second leg, the second leg being an extension of the shank, and a fishing line having two line portions, the line portions being wrapped around the second leg so as to form at least one pair of convolutions around the second leg, the fishing line also having a loop extending from one of the pair of convolutions, the loop extending around the first leg.

8. The hook and line combination of claim 7, wherein the first and second legs define an elongated clear space therebetween, and the clear space has a length several times the spacing between the first and second legs.

9. The hook and line combination of claim 8, wherein the first and second legs are spaced by a distance of between one and two times a diameter of the line.

10. The hook and line combination of claim 7, wherein the hook is formed from plastic or metal.

* * * * *